United States Patent [19]

Beehler

[11] Patent Number: 4,943,209

[45] Date of Patent: Jul. 24, 1990

[54] HUB FOR A PLASTIC BLOWER IMPELLER

[75] Inventor: Richard F. Beehler, Franklin, Tenn.

[73] Assignee: Heil-Quaker Corporation, Lavergne, Tenn.

[21] Appl. No.: 464,561

[22] Filed: Jan. 16, 1989

Related U.S. Application Data

[63] Continuation of Ser. No. 217,402, Jul. 11, 1988, abandoned.

[51] Int. Cl.⁵ .............................................. F04D 29/20
[52] U.S. Cl. .................................. 416/204 R; 416/207; 416/241 A
[58] Field of Search ................... 416/204 R, 207, 209, 416/219 R, 220 R, 221, 241 A; 415/214.1; 403/290, 361, 373, 375, 383

[56] References Cited

U.S. PATENT DOCUMENTS

| Re. 4,288 | 3/1871 | Buckman | 403/290 |
|---|---|---|---|
| 1,086,312 | 2/1914 | Blaha | 285/320 |
| 2,171,361 | 8/1939 | Gits et al. | 16/121 |
| 2,283,905 | 5/1942 | Beal | 403/290 |
| 2,568,913 | 9/1951 | Ead | 416/204 |
| 2,869,651 | 1/1959 | Rose | 416/214 |
| 2,882,077 | 4/1959 | Marsh | 403/383 |
| 2,926,839 | 3/1960 | Hutt | 415/111 |
| 2,975,004 | 3/1961 | Safianoff | 403/150 |
| 3,021,049 | 2/1962 | Settle | 416/185 |
| 3,182,345 | 5/1965 | Smith | 15/176.6 |
| 3,227,087 | 1/1966 | Albee et al. | 415/214.1 |
| 3,264,016 | 8/1966 | Reisch | 403/329 |
| 3,319,939 | 5/1967 | Rogenski | 416/204 |
| 3,326,134 | 6/1967 | Ohmann | 415/200 |
| 3,342,273 | 9/1967 | Crane | 415/204 |
| 3,392,996 | 7/1968 | Dunn, Jr. et al. | 403/373 |
| 3,399,911 | 9/1968 | Reisch | 403/329 |
| 3,464,622 | 9/1969 | Dennis | 416/178 |
| 3,867,055 | 2/1975 | Wooden | 403/373 |

FOREIGN PATENT DOCUMENTS

| 521767 | 5/1940 | United Kingdom | 403/383 |
|---|---|---|---|
| 783802 | 10/1957 | United Kingdom | 403/383 |

Primary Examiner—Edward K. Look
Assistant Examiner—John T. Kwon
Attorney, Agent, or Firm—Jeffers, Hoffman & Niewyk

[57] ABSTRACT

A plastic blower impeller including an integrally formed plastic hub having three axial slots therein equidistantly located around the hub. A bore in the hub includes transverse ribs for engaging with an annular groove in the driving shaft of an electric motor. A flat surface is formed inside the bore for engaging with the corresponding flat surface on the driving shaft of an electric motor. A resilient expandable split metal sleeve engages the exterior surface of the hub.

11 Claims, 3 Drawing Sheets

HUB FOR A PLASTIC BLOWER IMPELLER

This is a continuation of application Ser. No. 217,402, filed Jul. 11, 1988, now abandoned.

BACKGROUND OF THE INVENTION

This invention pertains to blowers and more particularly to plastic blowers which are used for handling hot corrosive gases and liquids.

Furnaces, such as those used in heating residences, are sometimes equipped with exhaust blowers which draw the hot products of combustion through one or more heat exchangers and then exhaust the products of combustion to a flu or a vent. In the use of such blowers, a substantial amount of heat is scrubbed from the products of combustion so that the temperature of the products of combustion, after passing through the heat exchangers, is approximately 100° F. The products of combustion contain carbon monoxide, carbon dioxide, as well as corrosive substances such as, for instance, sulfur. Furthermore, the products of combustion contain a large amount of water vapor which may condense in the exhaust blower and, by combining with the corrosive substances, may create a highly corrosive environment for the blower. It is therefore important that such exhaust blowers be able to withstand the corrosive products of combustion as well as the acidic water which may condense from the products of combustion. For that reason, such blowers are preferably constructed of molded thermoplastic material which has a high resistance to corrosion. The blower wheel or impeller of such blowers is thus preferably constructed as a one piece molded plastic part.

A problem in the construction of such blowers is to effectively secure the shaft of a driving electric motor to the plastic impeller. In the prior art, such impellers have been secured to motor shafts by special fastening means such as set screws, keys and key ways, deformable pressure ribs and special pressure flanges which fit over the impeller hub to tighten the hub down on the driving shaft Such arrangements have not been satisfactory due to their complexity and cost, the possibility that the driving shaft may work loose from the impeller during the life of the blower because of vibrations and the like, as well as due to plastic creep or deformation which occurs due to aging of the plastic.

A particular problem which must be overcome in plastic materials which are used for connecting plastic parts to steel parts, is the fact that thermoplastic materials are subject to creep which may cause the driving shaft of the blower to become loosened from the plastic impeller during the life of the blower. Thus it is desirable that a connection be provided which is not subject to this problem. It is also desirable that the attachment arrangement of plastic impellers allow removal of the impeller from the driving motor if servicing of the blower should be necessary. Still further, it is desirable that as few parts as possible be used in the attachment arrangement of the blower impeller to the motor shaft and that the impeller be secured to the motor shaft with a minimum of labor and cost.

SUMMARY OF THE INVENTION

The present invention, in one form thereof overcomes the disadvantages of the above described prior art plastic impellers and the driving securement means therefor by providing an improved plastic impeller and means for securing the impeller to a driving shaft. The impeller, according to the present invention, comprises a one piece thermoplastic impeller having a generally planar disk with vanes secured thereto. A cylindrical hub is secured to the disk and includes a central bore therein. The hub includes three axially oriented slots, thereby forming the hub into three cantilevered beam segments. One of the cantilevered beam segments includes a flat surface located inside the bore for metering with a corresponding flat surface of a driving shaft. The other beam segments include an internal transverse ridge located in the bore which cooperates with an annular groove in the driving shaft. A resilient split metallic tubular sleeve fits over the hub and prevents the beam segments from flexing outwardly, thereby insuring tight engagement of the hub with the shaft of the driving motor.

An advantage of the present invention is that the connection of the plastic impeller to the driving shaft is very strong and durable.

A further advantage of the present invention is that the plastic impeller can be removed from the driving shaft and replaced if service should be required.

Still another advantage of the present invention is that the connection of the plastic impeller to the driving shaft is effected with a minimum of parts and that the molded impeller does not need to be balanced.

A still further advantage of the present invention is that the plastic impeller is positively located with respect to the shaft during the assembly thereof and that no secondary operations to the impeller are necessary prior to assembly.

Yet still another advantage of the present invention is that the plastic impeller is securely locked to the driving shaft both axially and rotationally and that constant load pressure is exerted between the motor shaft and the plastic hub to compensate for aging and creep characteristics of the plastic material.

The present invention, in one form thereof, comprises a one piece, molded plastic blower impeller assembly having a generally planar disk section and a plurality of vanes secured to the disk. A hub portion of the disk and is used for securing the impeller to a driving shaft. The hub has a generally cylindrical portion, a bore in the cylindrical portion, and a transverse ridge on the cylindrical wall of the bore which is adapted to engage with an annular groove and a driving shaft. The hub also includes axial slots in the cylindrical portion thereof. A resilient expandable sleeve surrounds and engages with the cylindrical portion of the hub.

The present invention, in one form thereof, further comprises a plastic blower impeller which includes a generally planar disk and a plurality of vanes mounted on the disk. A cantilevered segment of the cylindrical hub is mounted on the disk. The hub includes three axial slots for forming the hub into three segments. The hub further includes a bore for receiving a driving shaft. A first of these segments includes a flat surface located inside the bore for engaging a corresponding flat surface of a driving shaft. A second of the segments includes a transverse rib located inside the bore for engaging with an annular groove in a driving shaft. A resilient expandable tubular metal sleeve surrounds the hub and engages the hub.

It is an object of the present invention to provide a plastic impeller which is easily assembled to a driving shaft and which does not require balancing prior to assembly to the shaft.

It is a further object of the present invention to provide a plastic impeller assembly which is strong and which may be effectively secured to a driving shaft.

Yet another object of the present invention is to provide a plastic impeller having a hub thereon which is comprised of cantilevered beam segments which may be effectively secured to a driving shaft with the use of a resilient expandable sleeve.

Still another object of the present invention is to provide a plastic impeller which may be removeably secured to a driving shaft.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
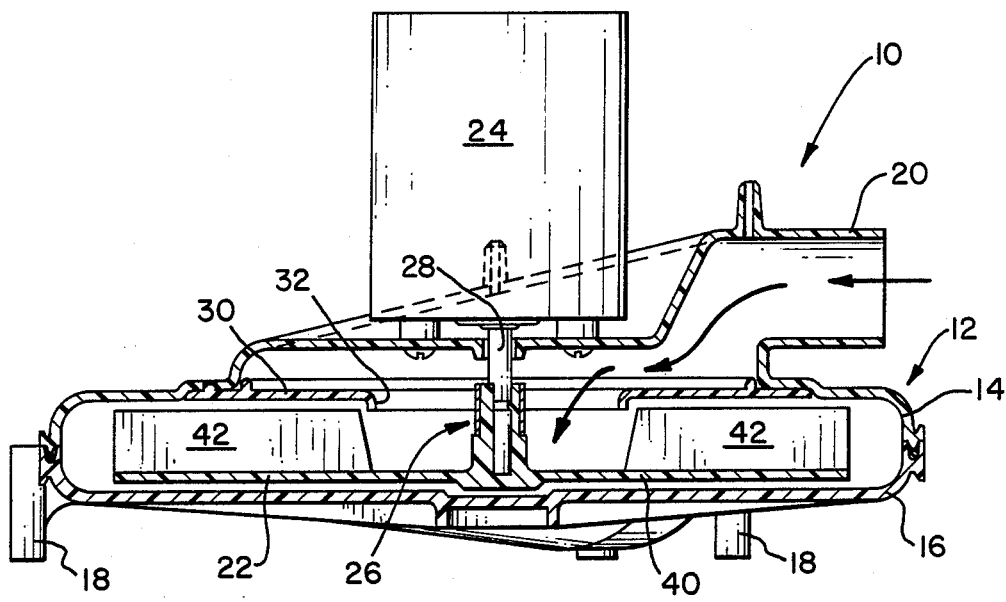
FIG. 1 is an elevational view, partially in cross-section, of a blower.
Figure 2:
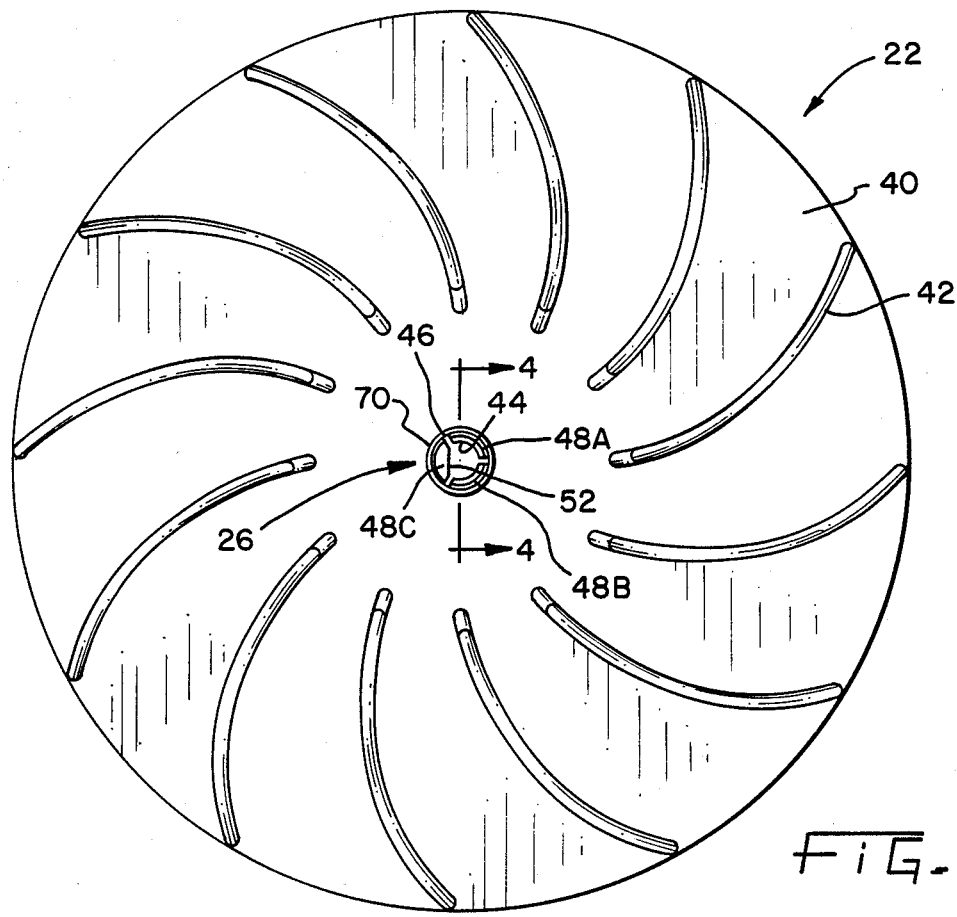
FIG. 2 is a top plan view of an impeller for the blower of FIG. 1.
Figure 3:
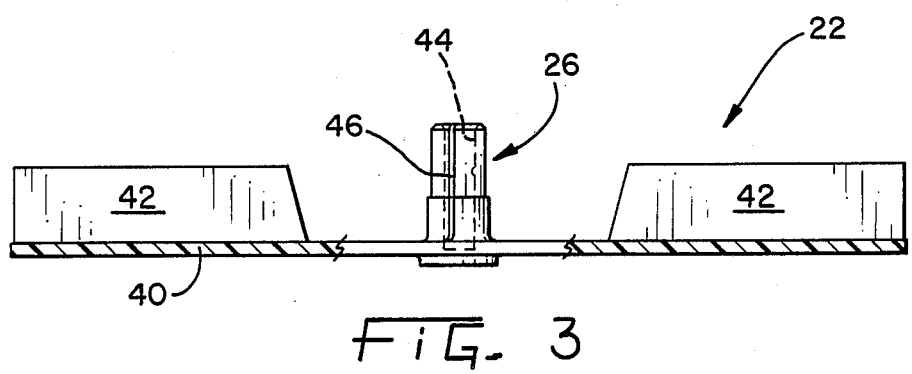
FIG. 3 is an elevational view of the impeller of FIG. 2.

Referring to FIG. 1, there is shown a plastic blower 10 including a housing 12 comprising two clam shell members 14 and 16. Clam shell member 16 includes feet 18 molded integrally with clam shell member 16. The blower includes an inlet 20 and an impeller 22. A driving motor 21 is provided including a shaft 28 for driving engagement with hub 26 of impeller 22. An orifice ring 30 is secured inside the housing and includes an aperture 32 so that gases drawn into inlet 20 are drawn through aperture 32 and are then exhausted through an exhaust outlet (not shown).

A detailed description of the blower assembly is provided in U.S. patent application Ser. No. 217,761 entitled BLOWER WITH CLAM SHELL HOUSING, filed on even date herewith and assigned to the assignee of the present invention, which has matured into U.S. Pat. No. 4,865,517, which disclosure is incorporated herein by reference.

Figure 4:
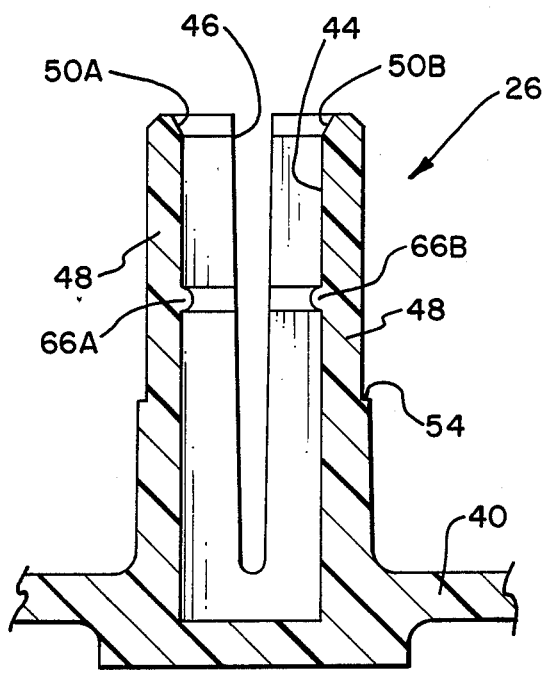
FIG. 4 is an enlarged, broken away cross-sectional view of the hub of the impeller of FIG. 2 taken along line 4—4 thereof.
Figure 5:
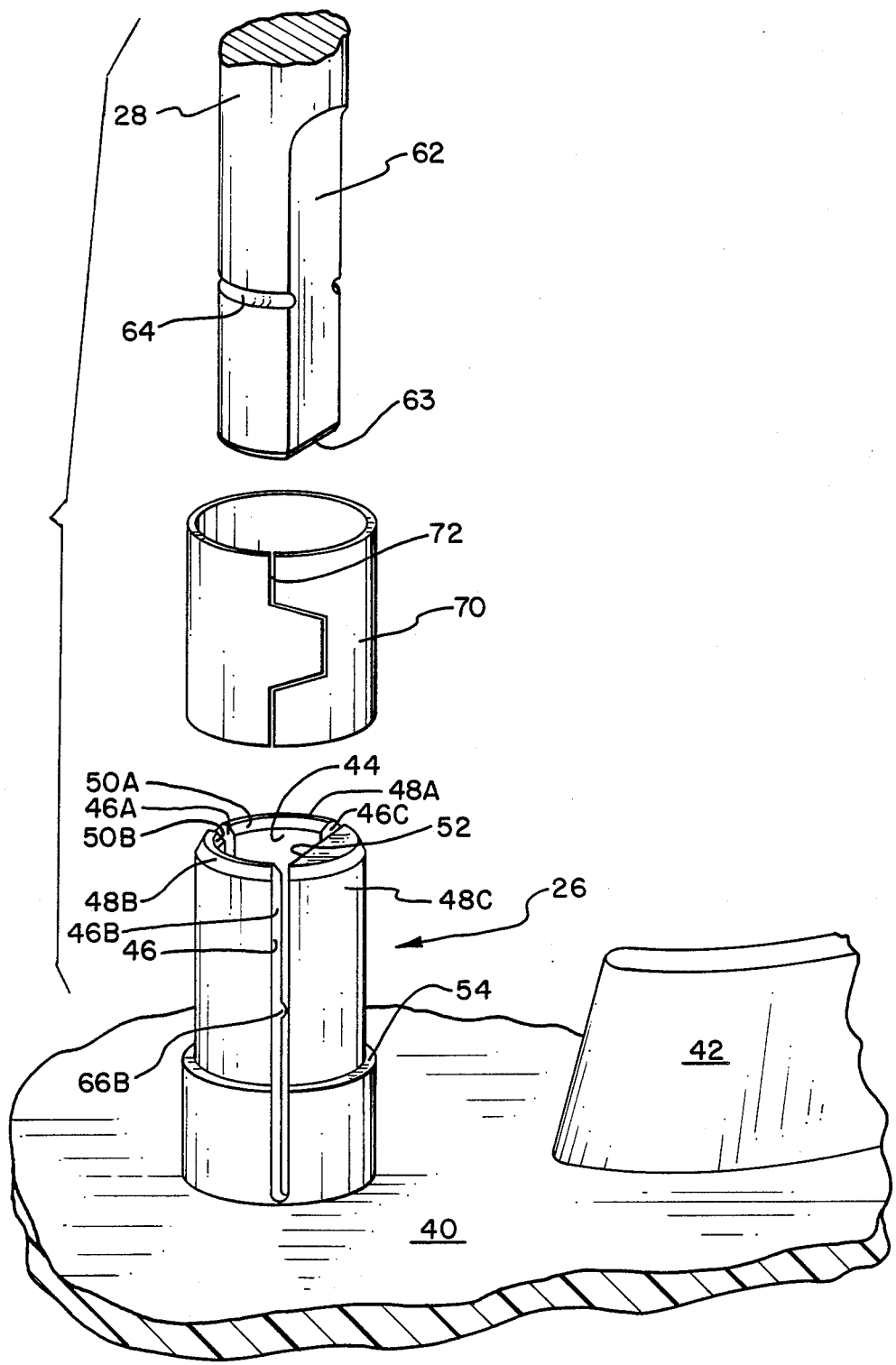
FIG. 5 is an enlarged exploded view of the hub assembly for the impeller of FIG. 3.

Referring now to FIGS. 2–6, impeller 22 includes a planar disk 40 having a plurality of vanes 42 integrally molded therewith. Hub 26 of impeller 22 includes a bore 44. It should be noted that the bore 44 includes no internal draft. Hub 46 also include three slots 46A, 46B, and 46C thereby dividing the hub into three segments 48A, 48B, and 48C as best shown in FIG. 5. Slots 46 are spaced around the periphery of hub 26 to ensure that flexural stress on each segment 48 is equal. This condition produces a uniform load on the shaft and planar disc thus causing minimum vibration and axial runout of the impeller. Thus, each of the segments 48 constitutes a cantilevered beam due to its securement thereof at one end to disk 40. Segments 48A and 48B each include a chamfer 50A and 50B for purposes further disclosed hereinafter. It should be noted that segment 48C does not include a chamber 50. A shoulder 54 is provided on the external surface of hub 26 for purposes further explained hereinafter.

Figure 6:
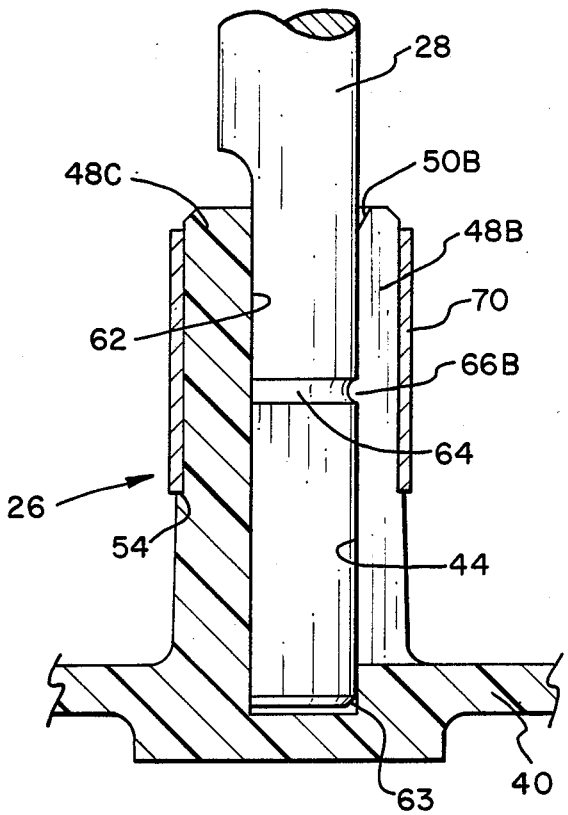
FIG. 6 is an enlarged broken away cross-sectional view of the hub assembly for the impeller of FIG. 2.

As best seen in FIGS. 4, 5 and 6, motor shaft 28 includes a flat surface 62 for engagement with a flat surface 52 of hub segment 48C. The engagement of surfaces 52 and 62 prevents rotation of the hub 26 relative to shaft 28. Shaft 28 also includes a groove 64 which engages with two transverse ridges or beads 66A and 66B which are formed integrally with segments 48A and 48B. By capturing ridges 66A and 66B in annular groove 64, shaft 28 is prevented from axial movement relative to hub 26. Since segments 48A, 48B and 48C are cantilevered on disk 40 and since the entire impeller 22 is constructed of a thermoplastic material, the cantilevered segments 48A, 48B and 48C are flexible and may flex outwardly due to ridges 66A and 66B when shaft 28 is inserted into bore 44. For this reason a resilient expandable tubular clamp or sleeve 70 is provided. The clamp is preferably constructed of spring steel and is split at 72 whereby the inside diameter of the sleeve is expandable to accommodate some variation in the size of hub 26. Thus, the sleeve 70 may be slipped over hub 26 until it comes to rest on shoulder 54. Hub segments 48 are thus prevented from flexing outwardly except as permitted by the inherent resiliency of sleeve 70 during the assembly process. Tubular clamp 70 thus clamps hub segments 48 securely onto shaft 28 and, by virtue of ridges 66 and flat area 52, shaft 28 is secured both rotationally and axially to hub 26. The resiliency of sleeve 70 compensates for creep characteristics of the plastic material of the hub during the aging process. Thus, contrary to prior art hub assemblies, the disclosed assembly insures that shaft 28 will remain securely attached to hub 26 throughout the life of the blower.

Impeller 22 may be removed from shaft 28 if it becomes necessary to service the blower, for instance, if motor 24 should fail. By firmly grasping impeller 22 and by applying considerable amount of axial force thereto, it is possible to separate the impeller from shaft 28. This is due to the expandability and inherent resiliency of clamp 70 which permits some flexing of segments 48A, 48B, and 48C outwardly to permit the ridges 66 to disengage from groove 64 as segments 48 flex outwardly.

It should also be noted that chamfers 50A and 50B cooperate with chamfers 63 of motor shaft 28 to ensure positive location of the motor shaft during assembly of the shaft to hub 26. Chamfers 50A and 50B guide shaft 28 downwardly while flat 52 positively locates against flat 62 whereupon the shaft 28 is pushed downwardly into bore 44 until ridges 66A and 66B snap into groove 64.

The material for construction a plastic impeller may be any suitable thermoplastic material. One material which has been found satisfactory is Merlon M-40 available from Mobay Plastics Company.

Impeller 22 is preferably formed as a unitary impeller by molding. It should be noted that bore 44 preferably contains no internal draft to ensure positive engagement of shaft 28 along its entire length with hub 26. The outside circumference of the hub 26 is also molded without external draft to ensure positive engagement and retention of sleeve 70.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

I claim:

1. A combustion blower comprising:
a housing having first and second housing shell members secured together to define a housing cavity, said first housing shell member including an aperture;
a motor mounted on said first housing shell member, said motor including a rotatable driving shaft which extends into said housing cavity through said aperture in said first housing shell member, said driving shaft including an annular groove;
a rigid plastic blower impeller removably mounted on said driving shaft for rotation therewith, said blower impeller including a generally planar disk, a hub mounted on said disk and having an end facing said first housing shell member, said hub including a bore in which said driving shaft is received, the wall of said bore including a rounded transverse ridge intermediate said disk and said hub end, said transverse ridge adapted to engage with said annular groove of said driving shaft, said hub including a plurality of axial slots, and a resilient expandable clamp surrounding and engaging said hub, whereby said driving shaft may be assembled into said bore while said clamp is engaged with said hub.

2. The impeller according to claim 1 wherein said hub includes a flat surface on the wall of said bore, said flat surface adapted to engage with a corresponding flat surface areas on said driving shaft.

3. The impeller according to claim 1 wherein said hub is cantilevered on said planar disk, the free end of said hub including a chamfer for guiding said driving shaft into said bore.

4. The impeller according to claim 1 including two further axial slots in said hub to form three hub segments, said three axial slots spaced around said cylindrical portion to ensure equal flexural stress on each hub segment.

5. The impeller according to claim 1 wherein said resilient clamp comprises a metallic sleeve having an axial slot therein whereby said sleeve may resiliently flex to accommodate variations in the circumferential size of said hub.

6. A combustion blower comprising:
a housing having first and second housing shell members secured together to define a housing cavity;
a motor mounted on said first housing shell member, said motor including a rotatable driving shaft which extends into said housing cavity through an aperture in said first housing shell member, said driving shaft including an annular groove;
a rigid plastic blower impeller removably mounted on said driving shaft for rotating therewith, said blower impeller comprising a generally planar disk, a plurality of vanes mounted on said disk, a cantilevered segmented cylindrical hub mounted on said disk and having an end facing said first housing shell member, said hub including three axial slots for defining three hub segments, said hub further including a bore for receiving said driving shaft, a first of said hub segments including a flat surface located inside said bore for engaging a corresponding flat surface of said driving shaft, a second of said hub segments including a rounded transverse rib intermediate said disk and said hub end located inside said bore for engaging with said annular groove of said driving shaft, and a resilient expandable tubular metal sleeve surrounding and engaging said hub.

7. The plastic impeller blower of claim 6 wherein a third of said hub segments includes a second transverse rib located inside said bore for engaging with an annular groove in said driving shaft.

8. The impeller according to claim 6 wherein said axial slots are located at predetermined locations around said cylindrical hub to cause equal amounts of flexural stress on each said hub segment.

9. A plastic blower impeller according to claim 6 wherein said resilient tubular metal sleeve includes an axial cut in one wall thereof whereby said sleeve is expandable.

10. The plastic blower impeller according to claim 6 wherein said second and third hub segments include chamfers at the free ends thereof for guiding a driving shaft into said bore.

11. The plastic blower impeller according to claim 6 including a transverse shoulder on the exterior of said hub for engaging said tubular metal sleeve.

* * * * *